(12) United States Patent
Cheng (10) Patent No.: US 9,083,637 B2
(45) Date of Patent: Jul. 14, 2015

(54) SYSTEM AND METHOD FOR PROVIDING DYNAMIC QOS TO MAXIMIZE BANDWIDTH UTILIZATION

(71) Applicant: NETGEAR, Inc., San Jose, CA (US)

(72) Inventor: Bing H. Cheng, Taichung (TW)

(73) Assignee: NETGEAR, Inc., San Jose, CA (US)

( * ) Notice: Subject to any disclaimer, the term of this patent is extended or adjusted under 35 U.S.C. 154(b) by 231 days.

(21) Appl. No.: 13/909,383

(22) Filed: Jun. 4, 2013

(65) Prior Publication Data

US 2014/0355427 A1  Dec. 4, 2014

(51) Int. Cl.
*H04L 12/851* (2013.01)
*H04L 12/26* (2006.01)
*H04L 12/859* (2013.01)
*H04L 12/857* (2013.01)

(52) U.S. Cl.
CPC ............ *H04L 47/24* (2013.01); *H04L 43/0888* (2013.01); *H04L 47/2475* (2013.01); *H04L 47/2491* (2013.01)

(58) Field of Classification Search
None
See application file for complete search history.

(56) References Cited

U.S. PATENT DOCUMENTS

| | | | |
|---|---|---|---|
| 2007/0127410 A1* | 6/2007 | Guo et al. | 370/328 |
| 2011/0276635 A1* | 11/2011 | Xiao et al. | 709/205 |
| 2011/0292800 A1* | 12/2011 | Flinta et al. | 370/235 |
| 2014/0355427 A1* | 12/2014 | Cheng | 370/230 |

* cited by examiner

*Primary Examiner* — Benjamin H Elliott, IV
(74) *Attorney, Agent, or Firm* — Boyle Fredrickson, S.C.

(57) ABSTRACT

A network device is configured to implement a QoS function to optimize bandwidth utilization includes a memory configured to store a high priority throughput value and a low priority bandwidth value, a network device input to communicate a data stream including a plurality of data packets to and from at least one computer system on the internal network, and a network device output to communicate the data stream including the plurality of data packets to and from at least one computer system on the external network. The network device further includes a computer processor configured to execute steps stored in non-volatile memory, the steps including identifying high priority data packets in the data stream to detect the high priority throughput value, setting the low priority bandwidth value, and periodically adjusting the low priority bandwidth value. This QoS function can work without the knowledge of actual bandwidth for any link in the networks.

22 Claims, 4 Drawing Sheets

SYSTEM AND METHOD FOR PROVIDING DYNAMIC QOS TO MAXIMIZE BANDWIDTH UTILIZATION

CROSS-REFERENCE TO RELATED APPLICATIONS

None.

FIELD OF INVENTION

This invention generally relates to the field of implementing a quality of service guarantee for high priority traffic in a network router and more particularly to a system and method for implementing a quality of service guarantee for high priority traffic that maximizes bandwidth utilization without knowledge of actual bandwidth.

BACKGROUND OF THE INVENTION

Quality of service (QoS) is functionality, known and referred to herein as QoS policing, used in computer networking to guarantee a certain level of performance to a data flow based on a priority level associated with each of the individual data packets in a data flow. Priority level may be assigned based on a variety of factors, such as identification of originating applications, devices or users. For example, a required bit rate, delay, jitter, packet dropping probability and/or bit error rate may be guaranteed for identified high priority data packets in the data flow. QoS functions are used to ensure data delivery for high priority applications where the network capacity is likely to be overloaded. Examples include real-time streaming multimedia applications that require a fixed bit rate and are delay sensitive, such as voice over IP, online gaming and streaming video. QoS functions also are important for networks where the capacity is a limited resource, for example in cellular data communication networks.

In computer networking, the QoS function is typically implemented in a network router. In the router, a desired level of service is set for each traffic type on the network. For example, by allowing video streaming to have a higher QoS than Internet traffic, there will be much less interference when sending and/or receiving video data because the network will reserve a relatively large portion of the bandwidth specifically for the video application.

QoS functions have traditionally required knowledge of the Internet bandwidth that is available for use. If the bandwidth is not known or the actual bandwidth is different from the bandwidth used in the QoS function, the QoS function will not work properly. For example, when the bandwidth used in the QoS function is higher than the actual available bandwidth, the QoS function will not work for application with flow control, such as transmission control protocol (TCP). Conversely, when the bandwidth used in the QoS function is lower than the actual available bandwidth, the QoS function will actually prevent application from using all of the available bandwidth, resulting in unnecessarily reduced internet traffic.

The requirement for QoS functions to know the correct existing bandwidth can cause a number of issues for users. For example, users may disable QoS functionality because they do not know the bandwidth and cannot properly configure their router. Further, even if the theoretical bandwidth is known, the actual; bandwidth may change dynamically. For example, bandwidth received at a cable modem may be received through an internet connection that is shared by a group of subscribers in the same area, degrading the actual bandwidth available to the router.

Accordingly, in order to determine bandwidth, QoS functions generally include functionality to ascertain and continuously monitor the actual bandwidth. However, bandwidth monitoring functionality has its own drawbacks. For example, bandwidth detection functions need to saturate the bandwidth in order to calculate an accurate maximum. This saturation necessarily interferes with normal application traffic during the detection operation. If the detection is performed frequently, the interference causes problems for users. If the detection is not performed frequently enough, there is an increased likelihood that the actual bandwidth will deviate from the theoretical bandwidth on which the QoS functions are based.

What is needed is a system and method for implementing QoS functionality in a network device without necessarily determining actual bandwidth. What is further needed is such a system and method configured to provide the QoS functionality specifically for communication with an external network system and/or application.

SUMMARY

According to one embodiment of the invention, a network device configured to implement a QoS function to optimize bandwidth utilization where the bandwidth is unknown is described. The network device includes a memory configured to store a high priority throughput value and a low priority bandwidth value, a network device input connected at least indirectly to an internal network and configured to communicate a data stream including a plurality of data packets to and from at least one computer system on the internal network, and a network device output connected at least indirectly to an external network and configured to communicate the data stream including the plurality of data packets to and from at least one computer system on the external network. The network device may further include a computer processor configured to execute steps stored, for example, in non-volatile memory. The steps may include identifying high priority data packets in the data stream, monitoring the high priority throughput value, setting the low priority bandwidth value, and periodically adjusting the low priority bandwidth value. The periodic adjustment can include increasing or decreasing the low bandwidth value, determining an effect of the temporary modification on the identified high priority data packets in the data stream, and modifying the low bandwidth value based on the determined effect.

In one embodiment, the network device is one or more of a router, a gateway device and a switch.

In another embodiment, the operation of identifying high priority data packets in the data stream step is performed for data packets in the data stream received from the external network and/or the identifying high priority data packets are identified as video streaming data packets.

In another embodiment, the periodic adjustment also includes determining that a total data packet throughput is relatively constant and/or identifying that the volume of high priority data packets is relatively constant.

In yet another embodiment, the decision to increase or decrease the low bandwidth value is based on a state diagram stored in the memory. The state diagram includes at least a state representing a balanced state in which the low bandwidth value is held constant, a dropping state in which the low bandwidth value is decreased, an increasing state in which the low bandwidth value is increased, and a vague state in which a total bandwidth is changing or unknown.

According to another embodiment of the invention, a computer implemented method, that may be embodied in a non-transitory computer readable medium, for implementing a QoS function to optimize bandwidth utilization in a network device where the bandwidth is unknown, is described. The method includes monitoring a data stream including a plurality of data packets, identifying high priority data packets in the data stream to detect a high-priority throughput value, setting a low priority bandwidth value, and periodically adjusting the low priority bandwidth value. The periodic adjustment includes temporarily increasing or decreasing the low bandwidth value, determining an effect of the modification on the identified high priority data packets in the data stream, and modifying the low bandwidth value based on the determined effect.

According to yet another embodiment of the invention, a network device configured to implement a QoS function to optimize bandwidth utilization where the bandwidth is unknown is described. The network device includes a memory configured to store a high priority throughput value and a low priority bandwidth value. The network device further includes a computer processor configured to execute a series of steps that may be stored in non-volatile memory, the series of steps including identifying high priority data packets in the data stream to detect the high priority throughput value, setting the low priority bandwidth value, and periodically adjusting the low priority bandwidth value. The periodic adjustment can include increasing or decreasing the low bandwidth value, determining an effect of the temporary modification on the identified high priority data packets in the data stream, and modifying the low bandwidth value based on the determined effect.

Other features and advantages of the invention will become apparent to those skilled in the art upon review of the following detailed description, claims and drawings in which like numerals are used to designate like features.

BRIEF DESCRIPTION OF THE DRAWINGS

Preferred exemplary embodiments of the invention are illustrated in the accompanying drawings in which like reference numerals represent like parts throughout, and in which.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Figure 1:
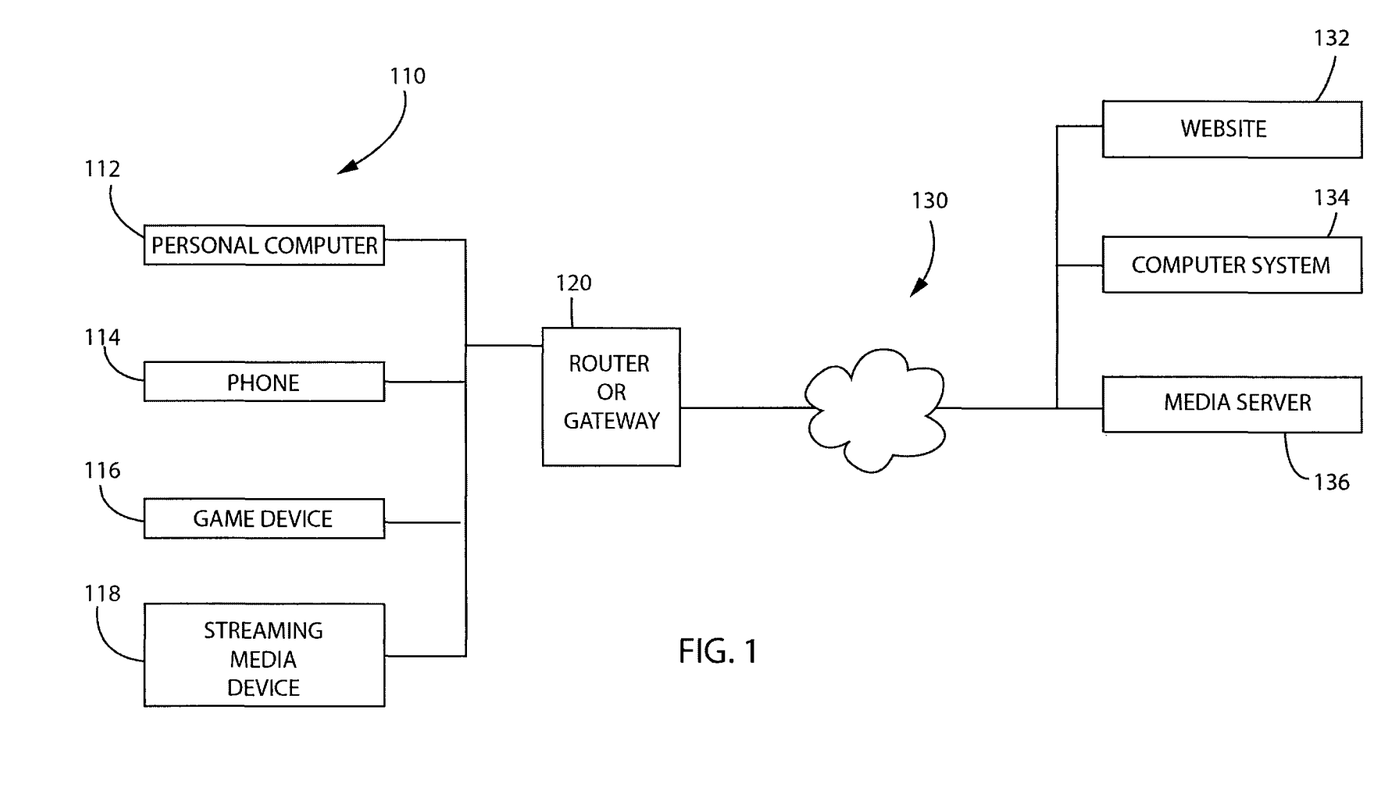
FIG. 1 schematically illustrates a networking environment for communicating information including a network device configured to provide QOS functionality between an internal network and an external network through a network device, according to an exemplary embodiment.

Referring now to FIG. 1, a networking environment 100 for communicating information between an internal network 110 and an external network 130 through a network device 120 is shown, according to an exemplary embodiment. The information being transmitted to and from external network 130 and internal network 110 is transmitted using a plurality of data packets, collectively referred to herein as a data stream. The data stream from external network 130 to internal network 110 is referred to as a "downlink data stream", while the data stream from internal network 110 to external network 130 is referred to as an "uplink data stream."

Internal network 110 may be a local area network configured to provide communication of information with a plurality of devices and applications in relatively close proximity to each other, such as within a home, school, office building, etc. Internal network 110 includes applications running on a personal computing device 112 such as a desktop computer, a laptop computer, a tablet, etc, a smartphone 114, a game device 116, and a streaming media player 118. Applications on a personal computing device 112 may include a high priority application, such as a web browsing application, a video player application, a telephony application, a video telephony application, etc. or a low priority application, such as a file downloader. It should be understood that although FIG. 1 show specific devices and applications, these are merely provided as examples. Internal network 110 may optionally include a single device in communication with network device 120. Any or all of these or other devices could be present in a given internal network. Internal network 110 may further include one or more additional network communication devices to provide intercommunication between devices on the network and communication with network device 120.

Internal network 110 may include one or more devices implementing high priority applications specifically configured to send and receive high priority data packets. High priority applications can be any applications that rely on the ability to send and/or receive time-sensitive data in time. Examples can include video telephony applications that are constantly sending and receiving video images and audio data in real time where any interruption and/or delay in data transmission will be highly visible to users of the applications. If the data is delayed, the images that are sent and received will necessarily be delayed, be displayed at a lower resolution, etc. Accordingly, the majority of data packets that are transmitted using a high priority application will use a flag in the header for each data packet, or any other identification method, to specifically identify each packet as a high priority data packet.

Internal network 110 may further include one or more low priority applications specifically configured to send and receive low priority data packets. Low priority applications can be any applications that do not rely on the ability to send and/or receive time-sensitive data in time and/or do not rely on the timing of the data to provide a high quality user experience. Examples can include applications that utilize, display and allow the user to manipulate downloaded data. Generally, this type of application will not require the constant sending and receiving of data timely and/or will not rely on the timing of such transmission in interacting with the user. Accordingly, the majority of data packets that are transmitted using a low priority application will use a flag in the header for each data packet, or any other identification method, to specifically identify each packet as a low priority data packet.

Internal network 110 may further include only high priority designated applications such that all other applications that are not specifically designated as high priority applications are treated as low priority applications. Internal network 110 may further include additional layers of priority with the functionality described herein adjusted such that data packets are provided with bandwidth allocation based on their relative priority values.

Accordingly to an exemplary embodiment, the applications on internal network 110 may utilize flow control to expedite bandwidth allocation. The QoS functionality described herein may be applied on the downlink (incoming) direction where it is unknown how much high-priority data and how much low-priority data will be received over the limited bandwidth. Whatever the priority is on the data packets that are received, it is how the bandwidth has been used by the high priority traffic vs. the low priority traffic during that past time. Where there is more traffic than available bandwidth, utilization of the bandwidth can be maximized by dropping some low priority data. With flow control, low priority applications will notice such packet drops and, with some implicit or explicit response to the remote end, the senders (for low priority data) will slow down the speed they send data. This slow down will decrease the bandwidth usage for low priority data and leave more space for high priority data.

Communication to, from, and between the devices on internal network 110 is provided by the network device 120. The link between devices 112-118 and network device 120 may be a wired network, such as Ethernet, or a wireless network, such as Wi-Fi. Devices 112-118 may also be configured for intercommunication, for example using the Bluetooth communication protocol and/or through network application 120 using an internal network address.

Network device 120 may be any device configured to manage the flow of data between internal network 110 and external network 130. Network device may, for example, comprise one or a combination of more than one of a router, a switch, or a gateway. Functionality described herein as being associated with network device may be implemented using one or more devices. For example, network device 120 may be configured to include a router in communication with a network switch, either of which can be configured to perform some or all of the functions described herein. Network device 120 may further be implemented using a plurality of network devices in communication with each other, such as a wireless access point in communication with a gateway router.

Network device 120 is configured to transmit data packets between the two computer networks. Data packets can include any type of bundled data transmitted between devices. Where network device 120 is a router, when a data packet is received from either internal network 110 or external network 130, the network device (router) 120 reads address information in the packet to determine their ultimate destination. In a packet-switched network, a "router" is a device which receives packets on one or more input interfaces and which outputs those packets on one of a plurality of output interfaces so as to move those packets within the network from a source device to a destination device. Each packet includes header information, which indicates the destination device in either internal network 110 or external network 130. The router includes routing information which associates an output interface with information about the destination device, such as one or more of the devices 112-118. The router 120 can also perform other operations on packets, such as rewriting the packets' headers according to their routing protocol, or re-encapsulating the packets from a first routing protocol to a second routing protocol. A router may further be configured to monitor the information being transported, such as to detect a priority associated with each data packet.

Network device 120 may be a gateway device that is the exclusive communication channel between internal network 110 and external network 130. Accordingly, all data packets provided to or from the internal network 110, including packet priority information, can be viewed using the network device 120. Network device 120 is further configured to implement a quality of service application configured to facilitate transmission of data packets flagged as having a higher priority value, as described in detail below with reference to FIG. 2.

External network 130 may be a wide area telecommunication network covering a broad area, such as the Internet. External network 130 may be connected to network device 120 using a wired or wireless connection. For example, a router network device 120 may be connected to a high-bandwidth connection such as a cable modem, a Digital Subscriber Line (DSL) modem, or an Integrated Services Digital Network (ISDN) connection to send and receive data with systems through external network 130.

External network 130 allows communication with one or more of a plurality of external systems including, for example an external web site 132, an external computing system 134, and a media server 136. These systems and applications may be accessible using an Internet Protocol address provided by any of the devices 112-118 and used by network device 120 to determine a destination for data transmitted to and/or from internal network 110 to external network 130.

In operation, network device 120 is configured to receive a downlink data stream from being transmitted to a system on the internal network 110. Based on the priority information included in the header information for data packets in the data stream or identified by any other method, the data packets are either transmitted as soon as possible to the system (for high priority packets) or are transmitted based on input from QoS functionality implemented by a processor in the network device 120 (for low priority data packets) as described in further detail below with reference to FIG. 2.

Figure 2:
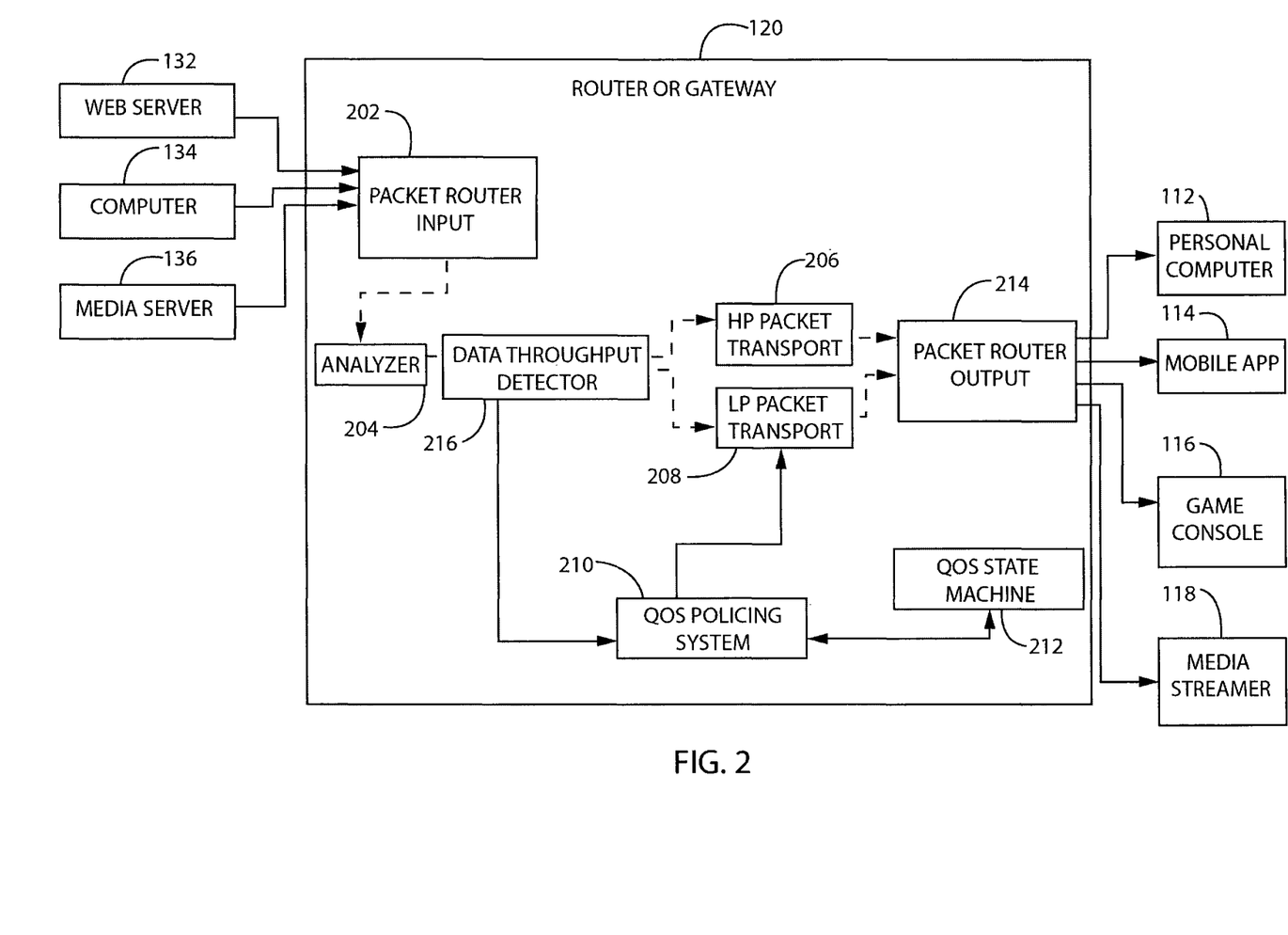
FIG. 2 illustrates an embodiment of the network device of FIG. 1 shown in greater detail.

Referring now to FIG. 2, network device 120 is shown in greater detail, according to an exemplary embodiment. Although network device 120 is shown in FIG. 2 as including specific components in an exemplary configuration, it is important to recognize that network device 120 may include more, fewer, and/or a different configuration of components to implement the functions described herein.

The functional components (not shown) of network device 120 may be implemented using hardware including a processing unit, a system memory, and a system bus that couples various system components, including the system memory, to the processing unit. The system bus may be any of several types of bus structures including a memory bus or memory controller, a peripheral bus, and a local bus using any of a variety of bus architectures. Further, the described components may be implemented using hardware and/or software.

The processing unit may be any type of computer processor configured to implement the functionality described herein including the steps of for configuring a network device to provide QoS functionality without determining actual bandwidth for downlink bandwidth. The processor may include a single processor or multiple processors performing a distributed computing function.

The system memory includes computer storage media in the form of volatile and/or nonvolatile memory such as read only memory (ROM) and random access memory (RAM). A basic input/output system (BIOS), containing the basic routines that help to transfer information between elements within network device 120, such as during start-up or networking operations, is typically stored in ROM. Although typically stored in ROM, memory may include offsite memory resident application, such as cloud computing based applications. RAM typically contains data and/or program modules that are immediately accessible to and/or presently being operated on by the processing unit. The appliance 120 may also include other removable/non-removable, volatile/nonvolatile computer storage media, such as flash memory.

Although network device 120 may be any of a variety of devices, for clarity network device 120 is further described herein with reference to a router-type network device as shown in FIG. 2. Router 120 includes a packet router input 202, an analyzer 204, high priority packet transport 206, a low priority packet transport 208, a QoS policing system 210, a QoS state machine 212, a packet router output 214 and a data throughput detector 216. Although network device 120 is shown in FIG. 2 as including a number of functional embodiments represented as separate components, it should be understood that the same functional component may be used to implement one or more of the functional embodiments. For example, the high priority packet transport 206 and low priority packet transport 208 may be a single routing program that treats data packets different based on information in each packet's header.

Packet router input 202 is an input port receiving data packets from the external network 130. Router input 202 may be an Ethernet port, a wireless receiver, or another device receiving network information from network 130.

Analyzer 204 is a software component configured to determine whether packets received from packet router input 202 include direct or indirect priority information in the packet header. Priority information may include a priority ranking, a one bit flag (set to "on" for high priority packets), or any other direct or indirect priority indication method. Where analyzer 204 determines that a received packet contains none of the above, the analyzer 204 may be configured to treat the data packet as either low priority or high priority by default. Analyzer 204 may further be configured to assign a priority value based on other information included in the data packet header, such as a source or destination application type. For example, analyzer 204 may be configured to treat all packets destined for a telephony application as high priority packets independent of whether the packets have been designated as such.

Based on the priority determination, analyzer 204 is configured to route high priority packets to high priority packet transport 206 and all other packets to low priority packet transport 208. Although only two packet transports are shown, network device 120 may be configured to include transports for a variety of priority levels in alternative embodiments. In such a system, bandwidth priority is allocated based on relative priority.

High priority packet transport 206 may be a packet queue implemented in memory of network device 120 and a packet queue management system configured to determine when packets are removed from the queue and provide to packet router output 214. Although a packet queue is shown and described herein, one of ordinary skill in the art would appreciate that this functionality may be implemented using a variety of different methods/data structures. High priority packet transport 206 is configured to provide packets received from analyzer 204 to the packet router output 214 as soon as possible. Generally, data packets received from analyzer 204 and designated as high priority are immediately provided to the output 214. Even high priority data packets may be queued however, based on particular circumstances, such as where the level of high priority data throughput is greater than the total available bandwidth which may be determined in a variety of ways, such as detecting dropped packets, rejections of packets by packet router output 214, etc. However, network device 120 may be configured such that the high priority packet transport 206 is not restricted based on data packets being transported through low priority packet transport 208.

Low priority packet transport 208 may also be a packet queue implemented in memory of network device 120 and a packet queue management system configured to determine when packets are removed from the queue and provide to packet router output 214. Low priority packet transport 208 is configured to provide packets received from analyzer 204 to the packet router output 214 based on the instructions from QoS policing system 210, which analyzes the bandwidth utilization information received from data throughput detector 216 as described in further detail below with reference to FIG. 3. The low priority bandwidth value may be the max bandwidth allowed for low priority traffic. Accordingly, network device 120 is configured such that the QoS policing system 210 is only used to restrict the bandwidth available for transmitting packets on low priority packet transport 208.

QoS policing system 210 software and/or hardware that is configured to determine a low priority bandwidth value and give instructions to low priority packet transport 208. The low priority bandwidth value may be periodically adjusted by the QoS state machine 212. Alternatively, the low priority bandwidth value may be adjusted by the QoS machine based on detected certain changes in high-priority throughput from data throughput detector 216. The operation of QoS policing system 210 and QoS state machine 212 are described below in further detail with reference to FIGS. 3 and 4.

Packet router output 214 is an output port transmitting data packets to the internal network 110. Router output 214 can be an Ethernet port, a wireless transmitter, or another device for transmitting network information to internal network 110.

Data throughput detector 216 is configured to calculate both a high-priority throughput value and a low priority throughput value by monitoring the rate at which packets are communicated through packet router input 202. The high-priority throughput value may be continuously updated by monitoring the total number of packets to high priority packet transport 206 that are transmitted from analyzer 204. Alternatively, the high-priority throughput value may be periodically generated by designating a specific time window, such as one (1) second, and monitoring the number/size of high priority packets transmitted during that time window. A detected low priority throughput value is similarly generated by monitoring the number of low priority packets transmitted. Data throughput detector 216 is further configured to generate a total utilized bandwidth value by summing the detected high bandwidth value and the detected low bandwidth value. The total utilized bandwidth value may be less than the total available bandwidth, which may not be known.

Figure 3:
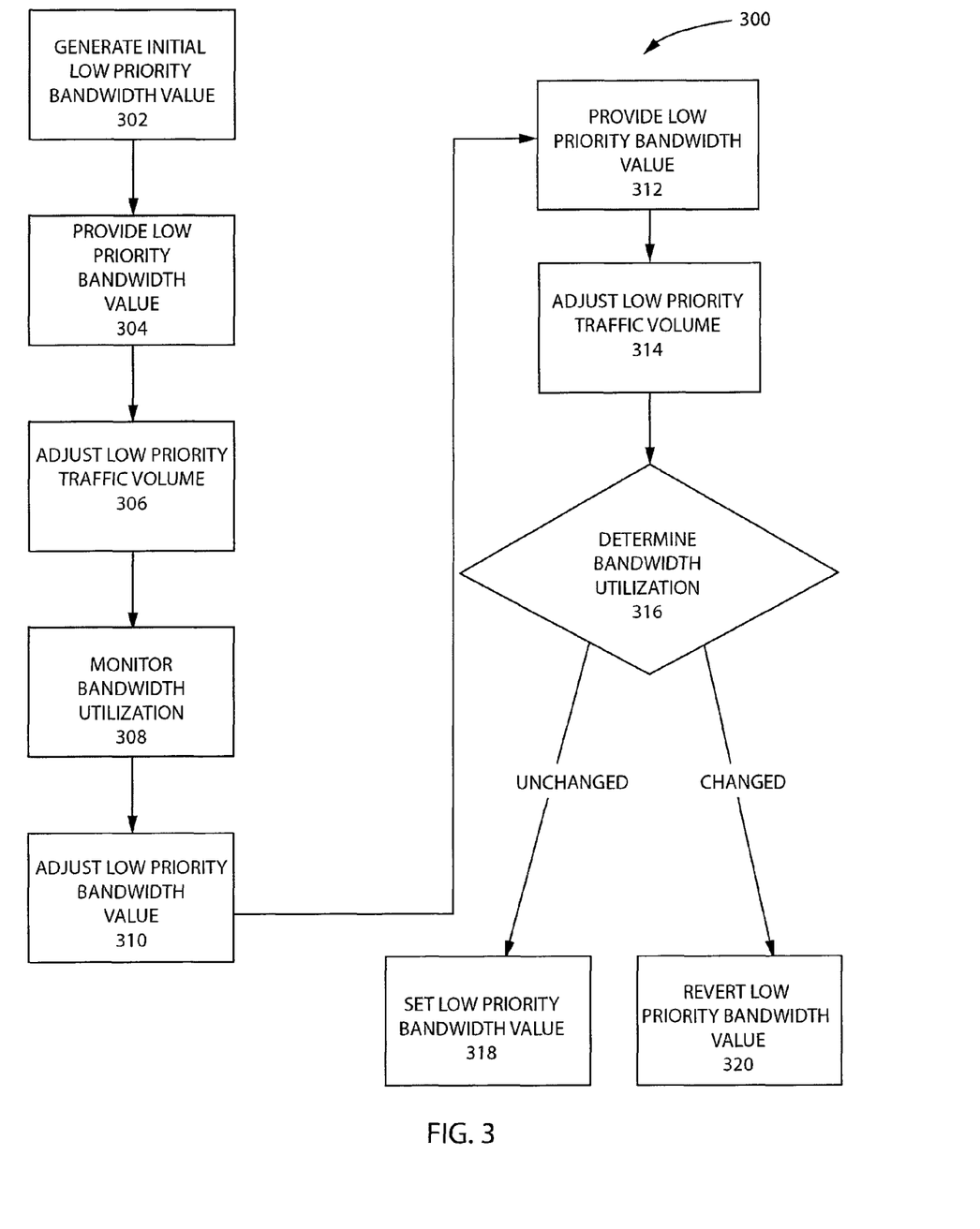
FIG. 3 is a flowchart for a method for configuring a network device to provide QoS functionality without necessarily determining actual bandwidth for a downlink, according to an exemplary embodiment.

QoS policing system 210 is configured to let high priority traffic pass through as much as possible. QoS policing system 210 also is configured to minimize any restriction to the bandwidth that high priority traffic can use and to only restrict low priority traffic. QoS policing system 210 and QoS state machine 212 receive input from data throughput detector 216 to monitor any changes to the high-priority throughput value and make changes to the low priority bandwidth value based on the high priority throughput value. Referring now also to FIG. 3, a flowchart 300 illustrating a method for providing dynamic QoS to maximize bandwidth utilization where total bandwidth is unknown is shown, according to an exemplary embodiment. Although flowchart 300 includes a multiple steps, performed in a defined order, the functions described herein can be performed using more, less and/or a different ordering of steps.

In a first step 302, QoS state machine 212 generates an initial low priority bandwidth value. The initial low priority bandwidth value may be obtained in any of a number of ways. For example, it may be generated based on the detected low-priority throughput value received indirectly from data throughput detector 216, it may be a default low priority bandwidth value configured based on a typical detected high priority throughput value, it may be initially set to equal zero, it may be initially set to a theoretical maximum bandwidth, or it may be determined based on user settings.

In a step 304, the low priority bandwidth value is provided as an input to the QoS policing system 210. Based on the received low priority bandwidth value and the bandwidth usage from the data throughput detector 216, the QoS policing system 210 give instruction accordingly to the low-priority packet transport 208 to restrict the low priority data throughput, restricting the number of low priority data packets released from low priority packet transport 208 in a given amount of time to meet a total bandwidth equal to or less than the low priority bandwidth value in a step 306. The instruction may be a simple as to restrict the low priority traffic volume to be equal to or less than the low priority bandwidth value generated by the QoS state machine 212.

In a step 308, QoS policing system 210 will receive updated high priority data throughput values and updated low priority data throughput values from data throughput detector 216. The detected throughput values are provided as inputs to the QoS state machine 212. Based on from the bandwidth utilization, the QoS state machine 212, as described below with reference to FIG. 4, modifies the low priority bandwidth value in a step 310.

Following step 310, step 312 is performed similar to step 304 such that the updated low priority bandwidth value is provided to the QoS policing system 210. The QoS policing system then instructs the low-priority transport 208 accordingly to adjust the low priority traffic volume in a step 314.

In a step 316, QoS state machine 212 monitors the high priority data throughput value based on the modification to the low priority bandwidth value in step 310. If the high priority data throughput value remains unchanged, the modified low priority bandwidth value will be stored in the memory of state machine 212 as the low priority bandwidth value in a step 318. If the high priority data throughput value is adversely affected, the modified low priority bandwidth value will revert to the low priority bandwidth value that was used prior to the modification in step 310 in a step 320.

QoS state machine 212 may be configured to include a determination (not shown) in which it determines whether the total throughput value is stable prior to implementation of modification in step 310. If there is an indication showing the total bandwidth could have decreased significantly, the state machine 212 may be configured to remove the bandwidth limit for low priority traffic to find the max throughput value without any constraint and to utilize that value as an assumption for total bandwidth. This step may not be performed often because, in practice, total downlink bandwidth does not fluctuate significantly very often. Specifically, while total bandwidth may fluctuate from time to time, it generally will stabilize shortly and then remain stable for a period of time. The changes in total bandwidth may be caused by changes to the applications and/or systems being used on internal network 110.

Figure 4:
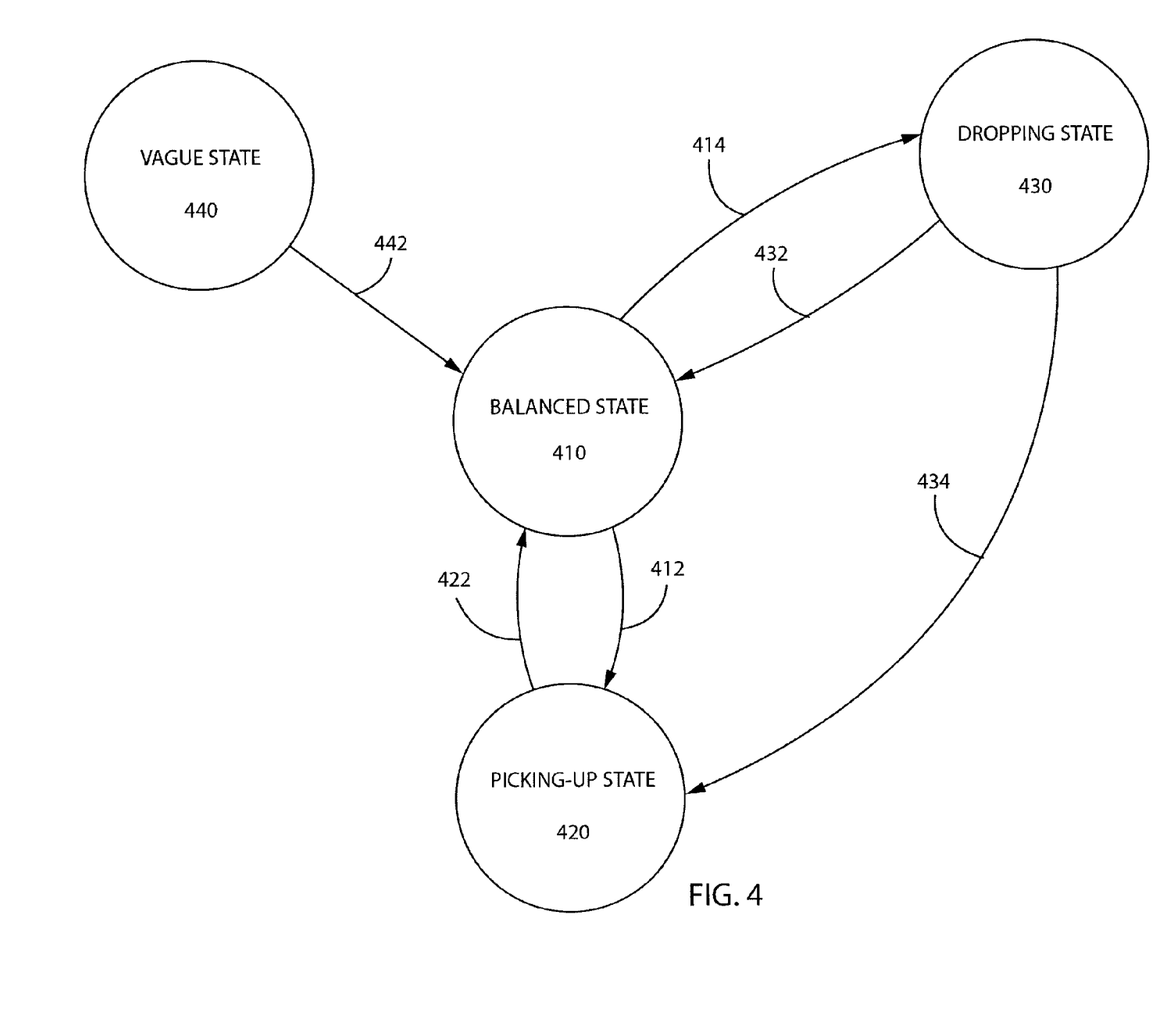
FIG. 4 is a state diagram showing states and state transitions for providing QoS functionality without determining actual bandwidth, according to an exemplary embodiment.

Referring now to FIG. 4, a state diagram 400 illustrating states used by the QoS state machine 212 in combination with one or more additional inputs to determine whether or not to modify the low priority bandwidth value, in accordance with an exemplary embodiment. The objective of state diagram 400 is to reserve required bandwidth for the transmission of high-priority traffic by controlling the low priority bandwidth value in accordance with received inputs. Accordingly, state diagram 400 does not restrict the bandwidth that high priority traffic can use. Instead, the only restriction is for low priority traffic. The inputs to QoS state machine 212 include at least the detected high-priority throughput value and the detected low-priority throughput value from data throughput detector 216.

State diagram 400 consists of four states and transitions between the four states such that the state machine 212 is always operating within one of the four states. Each of these states now will be described.

For the majority of the time, QoS state machine 212 stays in balanced state 410. State machine 212 stays in balanced state 410 when the high-priority throughput value is not decreasing from the current low priority bandwidth value. The QoS state machine 212 will exit balanced state 410 and transition to a picking up state 420 in a transition 412 based on a detected decrease in the high-priority throughput value while there is no indication of a total bandwidth decrease. Transition 412 may be made conditional on a detected stability in the high-priority throughput value at the decreased rate, i.e., the high-priority throughput value has not only decreased, but has remained at the decreased value for a period of time, such as 5 seconds. This time period is provided as an example only, as it should be understood that any time period may be used. The QoS state machine 212 is configured to periodically implement transition 414. The periodic transition implementation may be used to ensure maximization of the high-priority throughput value. Specifically, if the high-priority traffic remains at equal or higher throughput values (compared to the high-priority throughput value when the state machine entered the balanced state 410) for a period of time such as, for example, 5 seconds, the QoS state machine 212 will transition to the dropping state 430 to determine whether lowering the low priority bandwidth value for low priority data packets allows additional high-priority throughput utilization.

Picking up state 420 is the state that state machine 212 enters to increase the low priority bandwidth value. The purpose of picking up state 420 is to determine whether the total bandwidth that is available will allow an increase in low priority traffic without adversely affecting the high-priority throughput value. Accordingly, upon entry into picking up state 420, QoS state machine 212 will increase the low priority bandwidth value in small increments, for example 10% of the current high-priority throughput value, until a detected adverse change in the high-priority throughput value. QoS state machine 212 is configured to exit picking up state 420 and enter balanced state 410 in a transition 422 based on a detected adverse effect to the high-priority throughput value.

Dropping state 430 is the state that QoS state machine 212 enters to decrease the low priority bandwidth value. The purpose of dropping state 430 is to maximize the high-priority throughput value. Accordingly, upon entry of dropping state 430, QoS state machine 212 will decrease the low priority bandwidth value in small decrements and monitor the high-priority throughput value to identify any increase. If there is an increase in high-priority throughput, the low priority bandwidth value will be further decreased. If there is not an increase in high-priority throughput, QoS policing system 210 is configured to exit dropping state 430 and enter balanced state 410 in a transition 432.

QoS state machine 212 may be configured such that, upon entry into dropping state 430, and, following the first decrease in the low priority bandwidth value, if there is not an increase in the high-priority throughput value, QoS state machine 212 will immediately exit dropping state 430 and enter picking up state 420 directly in a transition 434 based on the determination that lowering the low priority bandwidth value does result in an increase in the high-priority throughput value.

Vague state 440 may be utilized by QoS state machine 212 as an initial state where the high/low priority throughput value is unknown and/or the total bandwidth is unknown. QoS state machine 212 may further be configured to enter vague state 440 based on a determination that the total available bandwidth detected by data throughput detector 216 is decreasing. QoS state machine 212 is configured to exit vague state 440 when the total bandwidth is stabilized and to enter balanced state 410 in a transition 442.

Advantageously, a network device 120 including a QoS state machine 212 may be configured to optimize bandwidth utilization where the total available bandwidth is unknown. Traditional QoS policing focuses on Internet bandwidth based on a belief that Internet bandwidth is a limiting factor. However, when there is a wireless connection (e.g. Wi-Fi) involved, the limiting factor may occur within the wireless connection. In this situation, a QoS implementation that only focuses on Internet bandwidth will not function properly. The QoS policing functionality described herein does not require knowledge of actual available bandwidth and does not consider Internet bandwidth as the only limiting factor. Accordingly, functionality described herein minimizes the need for user configuration and further adapts when the end-to-end bandwidth changes.

Although QoS state machine 212 is described and shown herein as being implemented with a network device such as a router, one of ordinary skill in the art would recognize that QoS functionality may be implemented on any computing device within network 110.

Certain terminology is used herein for purposes of reference only, and thus is not intended to be limiting. For example, terms such as "network device" refer to any system receiving and retransmitting information packets in a computer network.

References to "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It should be understood that a computer program may embrace constituent programs and that multiple programs may be implemented as a single or multiple programs.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A network device configured to implement a QoS function to optimize bandwidth utilization where the bandwidth is unknown, comprising:
   a network device input connected at least indirectly to an internal network and configured to communicate a data stream including a plurality of data packets to and from at least one computer system on the internal network;
   a network device output connected at least indirectly to an external network and configured to communicate the data stream including the plurality of data packets to and from at least one computer system on the external network; and
   a computer processor configured to execute steps stored in non-volatile memory, the series of steps including
      setting a low priority bandwidth value to an initial value;
      identifying high priority data packets in the data stream to detect a high priority throughput value,
      setting the low priority bandwidth value, and
      periodically adjusting the low priority bandwidth value, including
         increasing or decreasing the low bandwidth value,
         determining an effect of the modification on the high priority throughput value, and
         modifying the low bandwidth value based on the determined effect.

2. The appliance of claim 1, wherein the network device is at least one of a router, a gateway device, an access point and a switch.

3. The appliance of claim 1, wherein the step of identifying high priority data packets in the data stream step is performed for data packets in the data stream received from the external network.

4. The appliance of claim 3, wherein the high priority data packets are identified as video streaming data packets.

5. The appliance of claim 1, wherein the computer processor is additionally configured to perform the step of determining that a total data packet throughput is relatively constant.

6. The appliance of claim 5, wherein step of identifying high priority data packets in the data stream further includes identifying that the volume of high priority data packets is relatively constant.

7. The appliance of claim 1, wherein the computer processor is configured to decide whether to increase or decrease the low bandwidth value, based on a state diagram stored in the memory.

8. The appliance of claim 7, wherein the state diagram includes at least a state representing a balanced state in which the low bandwidth value is held constant, a dropping state in which the low bandwidth value is decreased, a picking up state in which the low bandwidth value is increased, and a vague state in which a total data packet throughput is changing or unknown.

9. A computer implemented method, embodied in a non-transitory computer readable medium, for implementing a QoS function to optimize bandwidth utilization in a network device where the bandwidth is unknown, the method comprising:
 monitoring a data stream including a plurality of data packets transmitted to and received from at least one computer system on an internal network to at least one computer system on an external network;
 identifying high priority data packets in the data stream to detect a high-priority throughput value;
 setting a low priority bandwidth value; and
 adjusting the low priority bandwidth value, including increasing or decreasing the low bandwidth value, determining an effect of the temporary modification on the identified high priority data packets in the data stream; and
 modifying the low bandwidth value based on the determined effect.

10. The method of claim 9, wherein the operation of identifying high priority data packets in the data stream step is performed for data packets in the data stream received from an external network.

11. The method of claim 10, wherein the operation of identifying high priority data packets are identified as video streaming data packets.

12. The method of claim 9, further including determining that a total data packet throughput is relatively constant prior to adjusting the low priority bandwidth value.

13. The method of claim 12, wherein the operation of identifying high priority data packets in the data stream further includes identify that the volume of high priority data packets is relatively constant.

14. The method of claim 9, wherein a decision to increase or decrease the low bandwidth value is determined based on a state diagram stored in the memory.

15. The method of claim 14, wherein the state diagram includes at least a state representing a balanced state in which the low bandwidth value is held constant, a dropping state in which the low bandwidth value is decreased, a picking up state in which the low bandwidth value is increased, and a vague state in which a total data packet throughput is changing or unknown.

16. A computer-implemented device configured to implement a QoS policing function to optimize bandwidth utilization where the bandwidth is unknown, the device comprising:
 a memory configured to store a high priority throughput value and a low priority bandwidth value; and
 a computer processor configured to execute a series of steps stored in non-volatile memory, the series of steps including
 identifying high priority data packets in a data stream including a plurality of data packets transmitted to and received from at least one computer system on an internal network to at least one computer system on an external network to detect the high priority throughput value, setting the low priority bandwidth value, and periodically adjusting the low priority bandwidth value, including increasing or decreasing the low bandwidth value, determining an effect of the temporary modification on the identified high priority data packets in the data stream, and modifying the low bandwidth value based on the determined effect.

17. The device of claim 16, wherein the identifying high priority data packets in the data stream step is performed for data packets in the data stream received from the external network.

18. The device of claim 17, wherein the high priority data packets are identified as video streaming data packets.

19. The device of claim 16, wherein the computer processor is additionally configured to determine that a total data packet throughput is relatively constant.

20. The device of claim 19, wherein the step of identifying high priority data packets in the data stream further includes identifying that the volume of high priority data packets is relatively constant.

21. The device of claim 16, wherein the computer processor is configured to decide whether to increase or decrease the low bandwidth value, is based on a state diagram stored in the memory.

22. The device of claim 21, wherein the state diagram includes at least a state representing a balanced state in which the low bandwidth value is held constant, a dropping state in which the low bandwidth value is decreased, a picking up state in which the low bandwidth value is increased, and a vague state in which a total data packet throughput is changing or unknown.

* * * * *